UNITED STATES PATENT OFFICE.

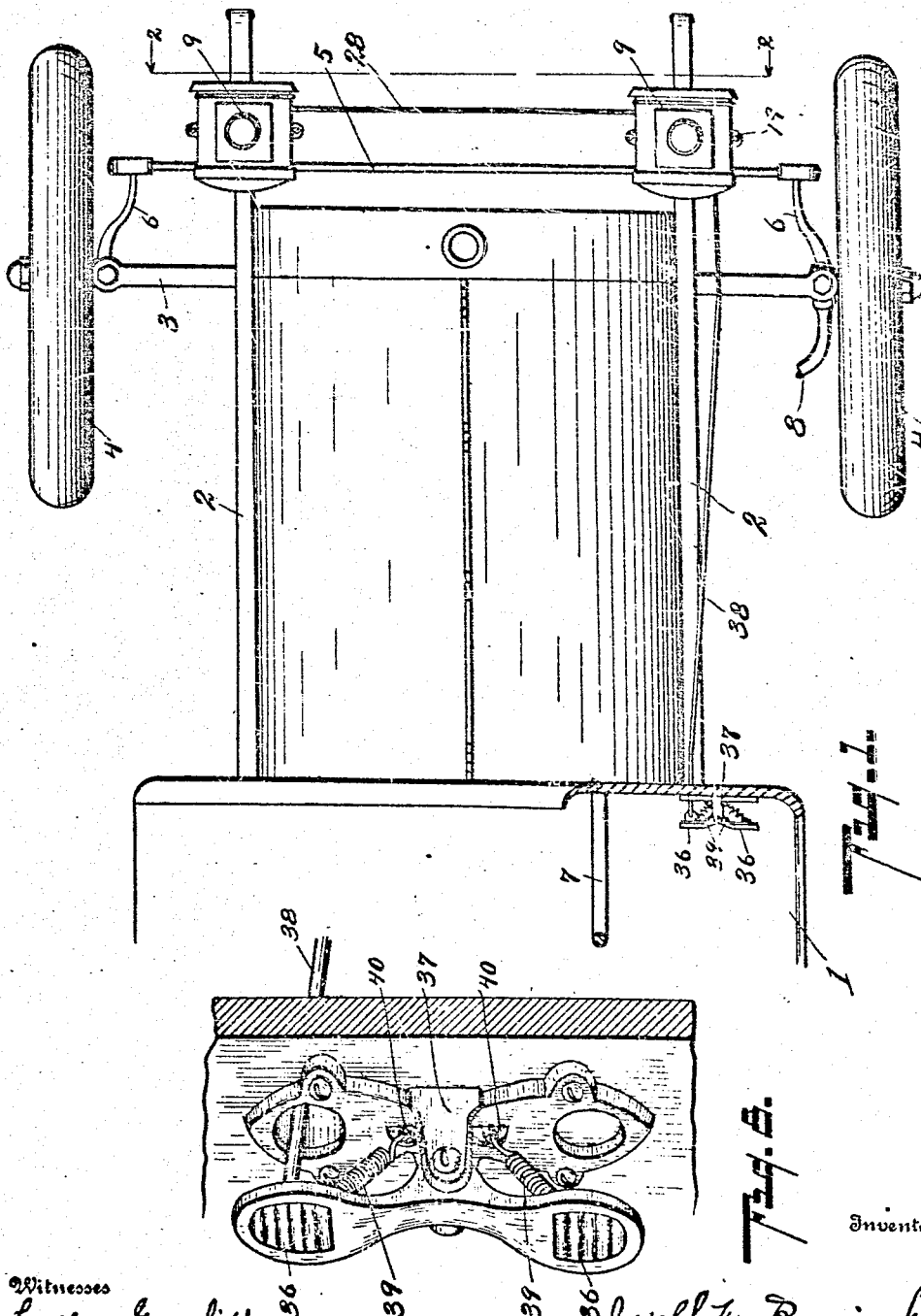

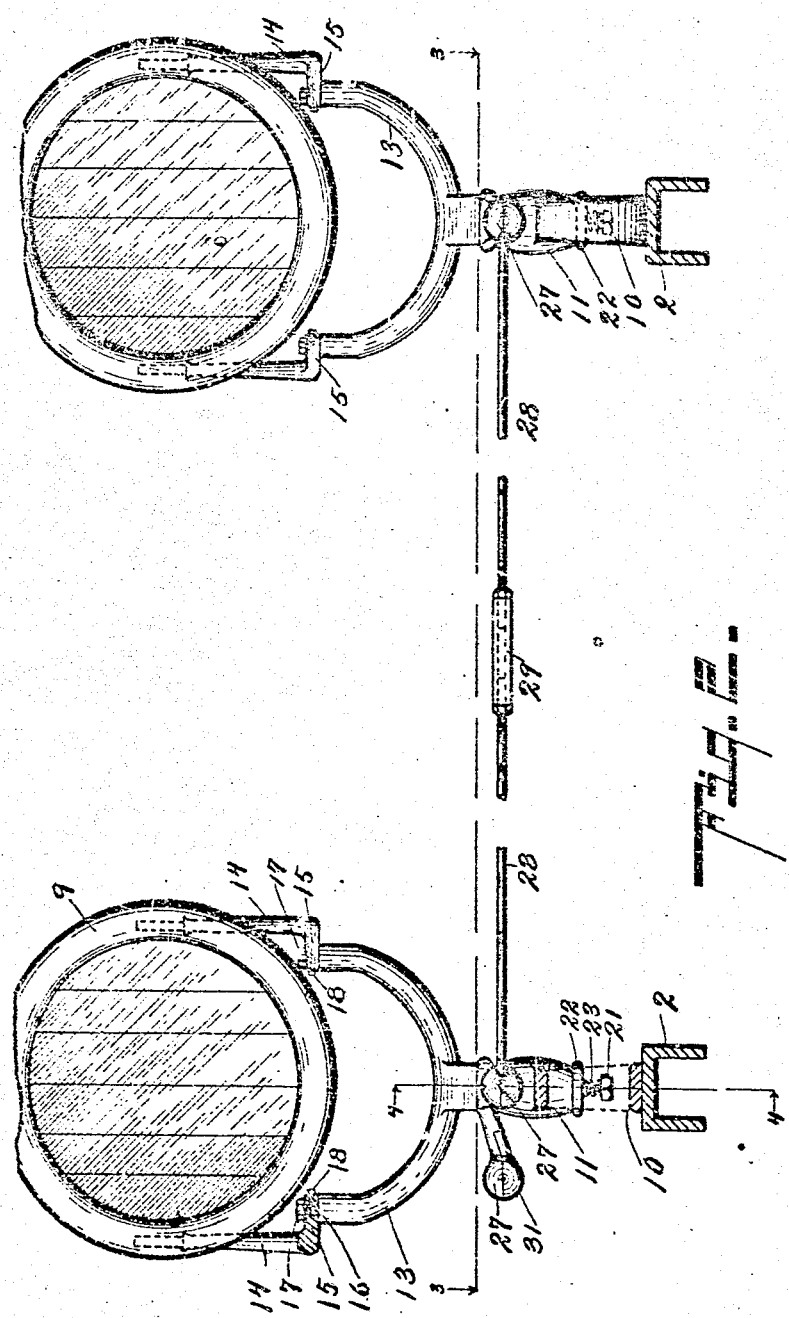

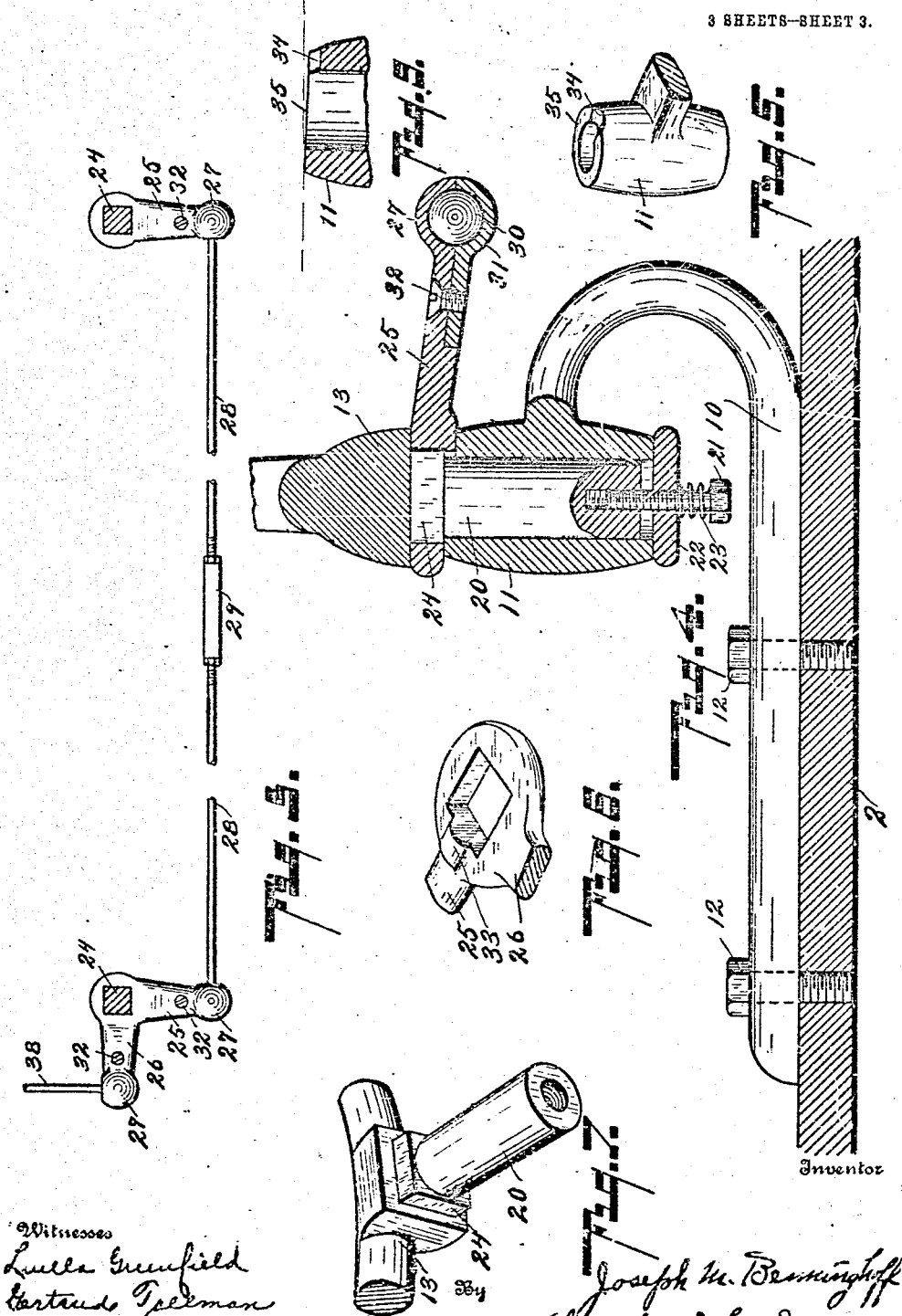

JOSEPH M. BENNINGHOFF, OF AUBURN, INDIANA, ASSIGNOR TO A. C. HIMEBAUGH, OF BURR OAK, MICHIGAN.

HEADLIGHT FOR VEHICLES.

981,834.  Specification of Letters Patent.  Patented Jan. 17, 1911.

Application filed March 29, 1910. Serial No. 552,199.

*To all whom it may concern:*

Be it known that I, JOSEPH M. BENNINGHOFF, a citizen of the United States, residing at Auburn, Indiana, have invented certain new and useful Improvements in Headlights for Vehicles, of which the following is a specification.

This invention relates to improvements in headlights for vehicles.

My improved headlight is particularly designed by me for use upon, and I have shown it applied to, an automobile.

The main objects of this invention are: First, to provide an improved headlight for vehicles, having a pair of lamps which may be simultaneously swung from side to side. Second, to provide in a headlight for vehicles, an improved lamp support. Third, to provide in a headlight for vehicles an improved operating connection for the lamps. Fourth, to provide in a headlight for vehicles an improved structure which is very simple and not likely to get out of repair.

Further objects and objects relating to structural details will definitely appear from the detailed description to follow.

I accomplish the objects of my invention by the devices and means described in the following specification.

The structure described constitutes one effective embodiment of my invention.

Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a detail plan of the front part of an automobile. Fig. 2 is an enlarged vertical section taken on a line corresponding to line 2—2 of Fig. 1. Fig. 3 is a horizontal section taken on a line corresponding to line 3—3 of Fig. 2. Fig. 4 is an enlarged detail vertical section taken on a line corresponding to line 4—4 of Fig. 2. Fig. 5 is an enlarged detail perspective view of the bearing portion of one of the supporting brackets 10. Fig. 6 is a detail perspective view of the arms 25 and 26. Fig. 7 is a perspective view of one of the lamp brackets 13. Fig. 8 is a detail perspective view of the foot lever. Fig. 9 is a detail front elevation of one of the supporting brackets.

In the drawings, similar reference numerals refer to similar parts throughout the several views, and the sectional views are taken looking in the direction of the little arrows at the ends of the section lines.

Referring to the drawing, 1 represents the body of an automobile, and 2 the longitudinal sill thereof, 3 the front axle, 4 the forward wheel, 5 the connecting link for the arms 6 on the wheel spindles which are of the usual or any desired construction. The steering post 7 is connected to the arm 8 through any suitable mechanism. These parts are represented to illustrate the application of my invention.

The lamps 9 are preferably of the well known headlight type. The supports for these lamps preferably consist of the supporting brackets 10 which are curved upwardly and rearwardly, and their free ends terminating in the vertically disposed bearing 11. These brackets 10 are mounted on the forward ends of the longitudinal sill 2 by means of the screws 12. The lamp brackets 13 are preferably forked and provided with adjustable arms 14. These arms are offset at 15 at their lower ends and provided with pivots 16 which are provided with suitable clamping nuts 17. Set screws are also preferably provided to assist in securing these arms in their adjusted positions. The upper ends of the arms are adapted to receive the ears 19 on the sides of the lamps. These arms may be adjusted to lamps of different sizes, and also the arms may be adjusted to properly focus the pair of lamps.

The lamp brackets are provided with spindles 20 which are arranged in the bearings 11 on the supporting bracket. (See Fig. 4.) The spindles are retained in the brackets by means of the screws 21 which are threaded into the lower ends of the spindles, the screws being arranged through the washer-like plates 22, which rest against the lower ends of the bearings. On the screws below these plates are springs 23 which, it will be observed, hold the spindles yieldingly downward in the bearings. The lamp brackets 13 are provided with squared shoulder portions 24 above the spindles which are adapted to receive the arms 25, 25 and 26, one of the arms 25 and the arm 26 being integrally formed in the structure illustrated. These arms are provided with socket joint members 27 at their outer ends. The arms 25 are connected by a coupling rod 28 having a turn-buckle 29 therein, so that the rod may be adjusted. At its ends the rod is provided with ball joint members 30 and the socket members are preferably provided with removable portions 31 attached by means of the screws 32 for convenience in assembling. The arms are preferably provided with cams or lugs 33 which ride on the upper ends of the bearings. The bearings are provided with notches 34 adapted to receive these cams or lugs when the parts are in their normal position. The bearings are also preferably provided with inclined surfaces 35 extending each way from these notches, so that there is a tendency for the lamps to return to their normal position. The springs 23 hold the parts yieldingly in their central position and tend to assist in returning them to that position.

The lamps are preferably shifted by means of the foot lever 36 which is pivoted on the bracket 37 mounted upon the dashboard of the vehicle body or in any suitable position. The lever 36 is connected by the link 38 to the arm 26, the link being preferably connected to the arm by means of the universal joint, such as described for the coupling rod 28.

The foot lever 36 is held yieldingly at its central position by means of the springs 39, which are connected thereto and to the ears 40, provided for the purpose on the bracket 37. These springs also assist in holding the lamps in their central or normal position, as well as returning the foot lever to its central or normal position.

My improved headlight is simple and economical in structure and at the same time is very effective. I have illustrated and described the same in detail in the form preferred by me on account of the structural simplicity of the parts and the convenience with which they may be assembled. I am aware, however, that it is capable of considerable variation in structural details without departing from my invention, and I desire to be understood as claiming the same specifically, as illustrated, as well as broadly, within the scope of the appended claims.

Having thus described my invention, what I claim as new and desire to secure by Letters Patent is:

1. The combination with the vehicle sills and body of a pair of lamps; supporting brackets having vertically disposed bearings thereon, mounted on said sills; lamp brackets having spindles for said bearings, said brackets being provided with squared portions above said spindles; a coupling for said lamps comprising arms arranged on the squared portions of said lamp brackets to rest on the upper ends of said bearings, said arms being provided with lugs and said bearings with notches adapted to receive said lugs when the lamps are in their normal positions; a connecting rod for said arms; screws threaded into the lower ends of said spindles; washer-like plates at the lower ends of said bearings through which said screws are arranged; springs arranged on said screws below said plates; a foot piece or lever mounted on said body; a link connected thereto and to one of said lamp brackets; and a spring for returning said foot piece to its normal position.

2. The combination with the vehicle sills and body of a pair of lamps; supporting brackets having vertically disposed bearings thereon mounted on said sill; lamp brackets having spindles for said bearings, said brackets being provided with squared portions above said spindles; a coupling for said lamps comprising arms arranged on the squared portions of said lamp brackets to rest on the upper ends of said bearings, said arms being provided with lugs and said bearings with notches adapted to receive said lugs when the lamps are in their normal positions; a connecting rod for said arms; screws threaded into the lower ends of said spindles; washer-like plates at the lower ends of said bearings through which said screws are arranged; and springs arranged on said screws below said plates.

3. The combination with the vehicle sills and body of a pair of lamps; supporting brackets having vertically-disposed bearings thereon mounted on said sills; lamp brackets; bearing spindles for said lamp brackets; a spring for holding said spindles yieldingly downward in said bearings; cam members operatively connected to said lamp brackets; coacting cam surfaces on said supporting brackets; arms on said lamp brackets; an adjustable connecting rod for said arms connected thereto by universal joints; and means for swinging said lamps, connected to one of said lamp brackets.

4. The combination with a pair of lamps, of supporting brackets having vertically-disposed bearings thereon; lamp brackets; bearing spindles for said lamp brackets; a spring for holding said spindles yieldingly downward in said bearings; cam members operatively connected to said lamp brackets; coacting cam surfaces on said supporting brackets; arms on said lamp brackets; a connecting rod for said arms; and means for swinging said lamps, connected to one of said lamp brackets.

5. The combination with a pair of lamps; supporting brackets having vertically-disposed bearings thereon; forked lamp brackets having adjustable arms thereon, said arms being provided with vertically offset pivots; bearing spindles for said lamp brackets; an adjustable connecting rod for said lamp brackets; and means for swinging said lamps, connected to one of said lamp brackets.

6. The combination with the lamp, of a supporting bracket having a vertically-disposed bearing thereon; a lamp bracket having a bearing spindle, said bracket being provided with a squared portion above said spindle; an arm arranged on said squared portion of said spindle, said arm being provided with a lug and said bearing with a notch adapted to receive said lug when the lamp is in its normal position; a screw threaded into the lower end of said spindle; a washer-like plate at the lower end of said bearing through which said screw is arranged; a spring on said screw below said plate; a foot piece or lever mounted on said body; a link connected thereto and to said arm; and a spring for returning said foot piece to its normal position.

7. The combination with the lamp, or a supporting bracket having a vertically disposed bearing thereon; a lamp bracket having a bearing spindle, said bracket being provided with a squared portion above said spindle; an arm arranged on said squared portion of said spindle, said arm being provided with a lug and said bearing with a notch adapted to receive said lug when the lamp is in its normal position; a screw threaded into the lower end of said spindle; a washer-like plate at the lower end of said bearing through which said screw is arranged; a spring arranged on said screw below said plate; and means for swinging said lamp bracket.

8. The combination with the lamp, of a supporting bracket having a vertically-disposed bearing thereon; a lamp bracket having a bearing spindle, said bracket being provided with a squared portion above said spindle; an arm arranged on said squared portion of said spindle, said arm being provided with a lug and said bearing with a notch adapted to receive said lug when the lamp is in its normal position; a spring arranged to hold said spindle yieldingly downward in said bearing; a foot piece or lever mounted on said body; a link connected thereto and to said arm; and a spring for returning said foot piece to its normal position.

9. The combination with the lamp, of a supporting bracket having a vertically-disposed bearing thereon; a lamp bracket having a bearing spindle, said bracket being provided with a squared portion above said spindle; an arm arranged on said squared portion of said spindle, said arm being provided with a lug and said bearing with a notch adapted to receive said lug when the lamp is in its normal position; a spring arranged to hold said spindle yieldingly downward in said bearing; and means for swinging said lamp bracket.

10. The combination with the lamp of a supporting bracket therefor, having a vertically-disposed bearing; a lamp bracket having adjustable arms thereon; a bearing spindle for said lamp bracket; a cam member operatively connected to said lamp bracket; a coacting cam surface on said supporting bracket; a screw threaded into the lower end of said spindle; a washer-like plate at the lower end of said bearing through which said screw is arranged; a spring arranged on said screw below said plate; and operating means connected to said lamp bracket.

11. The combination with the lamp of a supporting bracket therefor, having a vertically-disposed bearing; a lamp bracket having adjustable arms thereon; a bearing spindle for said lamp bracket; a screw threaded into the lower end of said spindle; a washer-like plate at the lower end of said bearing through which said screw is arranged; a spring arranged on said screw below said plate; and operating means connected to said lamp bracket.

In witness whereof I have hereunto set my hand and seal in the presence of two witnesses.

JOSEPH M. BENNINGHOFF. [L. S.]

Witnesses:
A. N. WILSON,
Mrs. C. H. KNAPP.